US012643387B2

(12) United States Patent
Wigg et al.

(10) Patent No.: US 12,643,387 B2
(45) Date of Patent: Jun. 2, 2026

(54) POWER UNIT REPLACEMENT SYSTEM FOR A WORK MACHINE

(71) Applicant: Caterpillar Inc., Peoria, IL (US)

(72) Inventors: Jason Prakash Wigg, Ridgley (AU); Christopher Douglas Carpenter, Plainfield, IL (US); Thomas Aldridge, Romaine (AU); Rowan Terry Franks, Penguin (AU); Travis C. Parker, Bloomington, MN (US); Matthew Thomas Hansen, Big Rock, IL (US); Steven D. Springer, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 284 days.

(21) Appl. No.: 18/491,532

(22) Filed: Oct. 20, 2023

(65) Prior Publication Data

US 2025/0128588 A1     Apr. 24, 2025

(51) Int. Cl.
B60K 1/04          (2019.01)
H01M 50/249        (2021.01)
E02F 9/08          (2006.01)

(52) U.S. Cl.
CPC ............. B60K 1/04 (2013.01); H01M 50/249 (2021.01); *B60K 2001/0416* (2013.01); *B60K 2001/0477* (2013.01); *B60K 2001/0494* (2013.01); *E02F 9/0858* (2013.01); *H01M 2220/20* (2013.01)

(58) Field of Classification Search
CPC .. B60L 53/80; B60L 2200/40; B60Y 2200/41; B60Y 2200/411; B60Y 2200/412; B60Y 2200/91; B60Y 2200/912; B60Y 2400/112; B60K 2001/0477; B60K 2001/0416; B60K 2001/0494; B60K 1/04; B60K 1/00; H01M 50/249; H01M 2220/20; E02F 9/0858
See application file for complete search history.

(56) References Cited

U.S. PATENT DOCUMENTS

| | | | |
|---|---|---|---|
| 5,275,525 A | | 1/1994 | Grumblatt |
| 5,562,390 A | * | 10/1996 | Christenson ............. B60P 1/20 |
| | | | 414/408 |
| 11,254,224 B2 | | 2/2022 | Hickey et al. |
| 11,396,237 B2 | | 7/2022 | Hickey et al. |
| 2012/0018235 A1 | * | 1/2012 | O'Quinn .................. B60K 1/04 |
| | | | 180/68.5 |

(Continued)

FOREIGN PATENT DOCUMENTS

| | | | |
|---|---|---|---|
| DE | 102006016801 A1 | 10/2007 | |
| EP | 4026739 A1 | 7/2022 | |

*Primary Examiner* — Lori Wu
(74) *Attorney, Agent, or Firm* — Harrity & Harrity

(57) ABSTRACT

A machine may include a frame and a lift system. The lift system may include a lift arm attached to the frame. The lift arm may be configured to actuate between a raised position and a lowered position. The lift system may include a roller attached to the frame. The machine may include a power unit including an energy storage unit and a power unit housing containing the energy storage unit. The power unit housing may include an engagement element configured to engage the power unit housing with the lift arm. The power unit housing may include a cam element, projecting from the power unit housing, configured to slidably engage with the roller during actuation of the lift arm.

20 Claims, 4 Drawing Sheets

(56)  References Cited

U.S. PATENT DOCUMENTS

| | | | |
|---|---|---|---|
| 2020/0353838 A1 | 11/2020 | Zhang et al. | |
| 2022/0097535 A1* | 3/2022 | Hickey | B60K 1/00 |
| 2022/0097554 A1 | 3/2022 | Hickey | |
| 2023/0191939 A1* | 6/2023 | Zhang | H01M 50/262 |
| | | | 180/68.5 |
| 2024/0234908 A1* | 7/2024 | Zhang | H01M 50/249 |

* cited by examiner

POWER UNIT REPLACEMENT SYSTEM FOR A WORK MACHINE

TECHNICAL FIELD

The present disclosure relates generally to work machines and, for example, to a power unit replacement system for a work machine.

BACKGROUND

Diesel-powered work machines produce diesel particulates and emissions. In open work areas, the emissions from the diesel-powered work machines are dissipated into the atmosphere and do not accumulate around the work machine in high concentrations. In contrast, in closed work areas, such as mines, the emissions can build up within the closed work areas, and ventilation must be provided to prevent hazardous conditions. As an alternative to diesel-powered work machines, battery-powered electric drive work machines that produce zero emissions can be used for underground mining in order to reduce the need for mine ventilation. Electric drive work machines also produce less heat, such that the closed work area can remain cooler than with diesel powered work machines, thereby reducing the need for cooling systems.

Electric drive work machines may operate in remote locations, such as mines, where battery charging infrastructure is limited. Moreover, the process of recharging the batteries of such work machines can be time consuming. In some cases, a battery swap can be used to replenish the energy for an electric drive work machine when charging infrastructure is unavailable and/or to reduce downtime associated with recharging. In a battery swap, a used battery pack of a work machine can be lifted off the work machine using a lift arm of the work machine and lowered to a ground surface. The lift arm may connect near a top of the battery pack (e.g., above a center-of-gravity of the batter pack), resulting in a bottom of the battery pack swinging inward during lifting of the battery pack. This swinging may cause the battery pack to impact the work machine, thereby damaging the battery pack and/or the work machine. Moreover, as the battery pack is being lowered to the ground surface, a tilted orientation of the battery pack due to the swinging may cause the battery pack to tip over when the battery pack is set down on the ground surface, thereby damaging the battery pack.

Germany (DE) Patent Application No. 102006016801 (the '801 application) discloses an industrial truck having a battery that is arranged in a battery trough. The truck has a vehicle frame that has a chassis that is designed to hold the battery trough, and means for guiding the battery trough when it is pushed into the frame. Particularly, the '801 application discloses that in order to simplify battery replacement and to reduce the risk of damage to the battery trough, at least one guide roller is provided for engagement with a side wall of the battery trough.

The guide roller(s) of the '801 application lack features to reduce swinging or tipping of the battery trough, or to otherwise maintain the battery trough in an upright orientation when the battery trough is removed or introduced to the truck. Accordingly, the '801 application does not address how to prevent damage to a battery and/or to a machine that could result from swinging or tipping of a battery during a battery swap. Moreover, the battery trough of the '801 application is pushed into the frame horizontally relative to a ground surface, rather than using a lifting movement. Such a horizontal procedure requires additional space for a battery swap, and may not be suitable for tight spaces, such as a mine.

The power unit replacement system of the present disclosure solves one or more of the problems set forth above and/or other problems in the art.

SUMMARY

A machine may include a frame. The machine may include a lift system including a lift arm attached to the frame, where the lift arm is configured to actuate between a raised position and a lowered position, and a roller attached to the frame. The machine may include a power unit including an energy storage unit and a power unit housing containing the energy storage unit. The power unit housing may include an engagement element configured to engage the power unit housing with the lift arm, and a cam element, projecting from the power unit housing, configured to slidably engage with the roller during actuation of the lift arm.

A machine may include a frame. The machine may include a lift system. The lift system may include a lift arm attached to the frame, where the lift arm is configured to actuate between a raised position and a lowered position. The lift system may include a roller, attached to the frame, configured to slidably engage with a cam element of a power unit for the machine during actuation of the lift arm. The machine may include a lock system including a latch element, and a locking cylinder configured to extend to a locked position in the latch element and retract to an unlocked position from the latch element, where the locking cylinder is configured to engage a locking lug of the power unit.

A power unit for a machine may include an energy storage unit, and a power unit housing containing the energy storage unit. The power unit housing may include an engagement element configured to engage the power unit housing with a lift arm of the machine, and a cam element, projecting from the power unit housing, configured to slidably engage with a roller of the machine during actuation of the lift arm.

DETAILED DESCRIPTION

This disclosure relates to a power unit replacement system, which is applicable to any machine that utilizes an electric drive.

Figure 1:
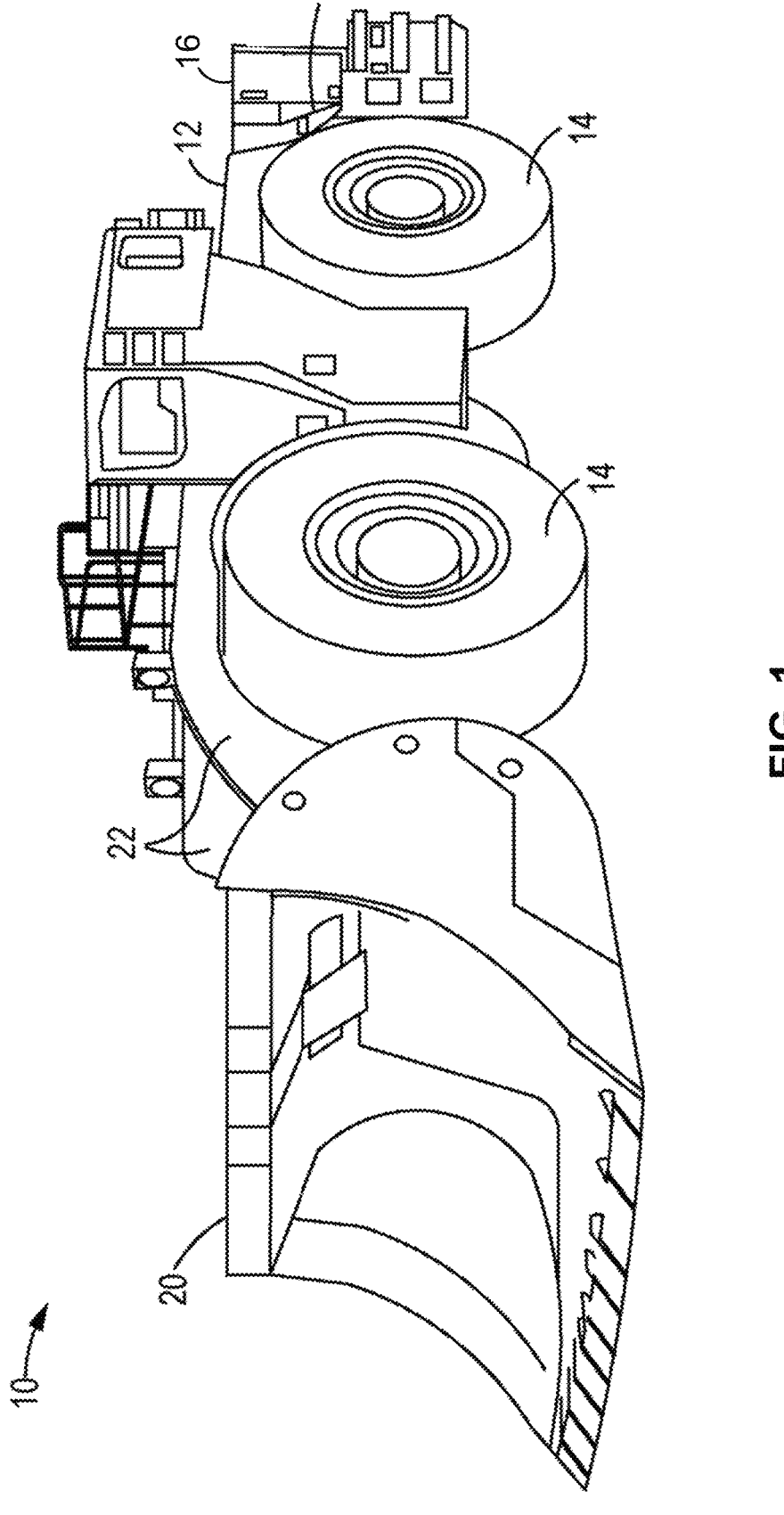
FIG. 1 is a perspective view of an example machine.

FIG. 1 is a perspective view of an example machine 10. The machine 10 may be a work machine. For example, the machine 10 may perform earth moving, excavation, or another operation associated with an industry, such as mining. As an example, as illustrated in FIG. 1, the machine 10 is an underground mining machine, such as an underground load-haul-dump (LHD) loader. In some examples, the machine 10 is a different type of underground mining machine, such as an underground articulated truck (UAT). However, the machine 10 may be another type of machine, such as a compactor machine, a paving machine, a cold planer, a grading machine, a backhoe loader, a wheel loader, a harvester, an excavator, a motor grader, a skid steer loader, a tractor, or a dozer, among other examples. The machine 10 is an electric drive machine (e.g., that is battery powered).

The machine 10 may include a frame 12 supported by a plurality of ground-engaging members 14, which are illustrated as wheels. Additionally, or alternatively, the ground-engaging members 14 may include track assemblies, skids, or the like. The ground-engaging members 14 are used to propel the machine 10 over a work surface. In some examples, the frame 12 may include an articulated joint (not shown) to allow a front frame portion and a rear frame portion to pivot with respect to each other. The machine 10 includes a power unit 16 to provide power to the ground-engaging members 14 via an electromechanical drivetrain 18. For example, the power unit 16 may provide power to an electric motor (not shown) of the machine 10. The machine 10 may further include an implement 20 mounted to the frame 12 that may be used to manipulate and/or transport work material at a worksite. For example, the implement 20 may be mounted to the frame 12 by a pair of lift arms 22. The implement 20 may include a bucket, as shown. In some implementations, the power unit 16 may provide power to the implement (e.g., via a hydraulic system). In some examples, the implement 20 may include a bed, or dump body, pivotally connected to the frame 12.

As indicated above, FIG. 1 is provided as an example. Other examples may differ from what is described with regard to FIG. 1.

Figure 2:
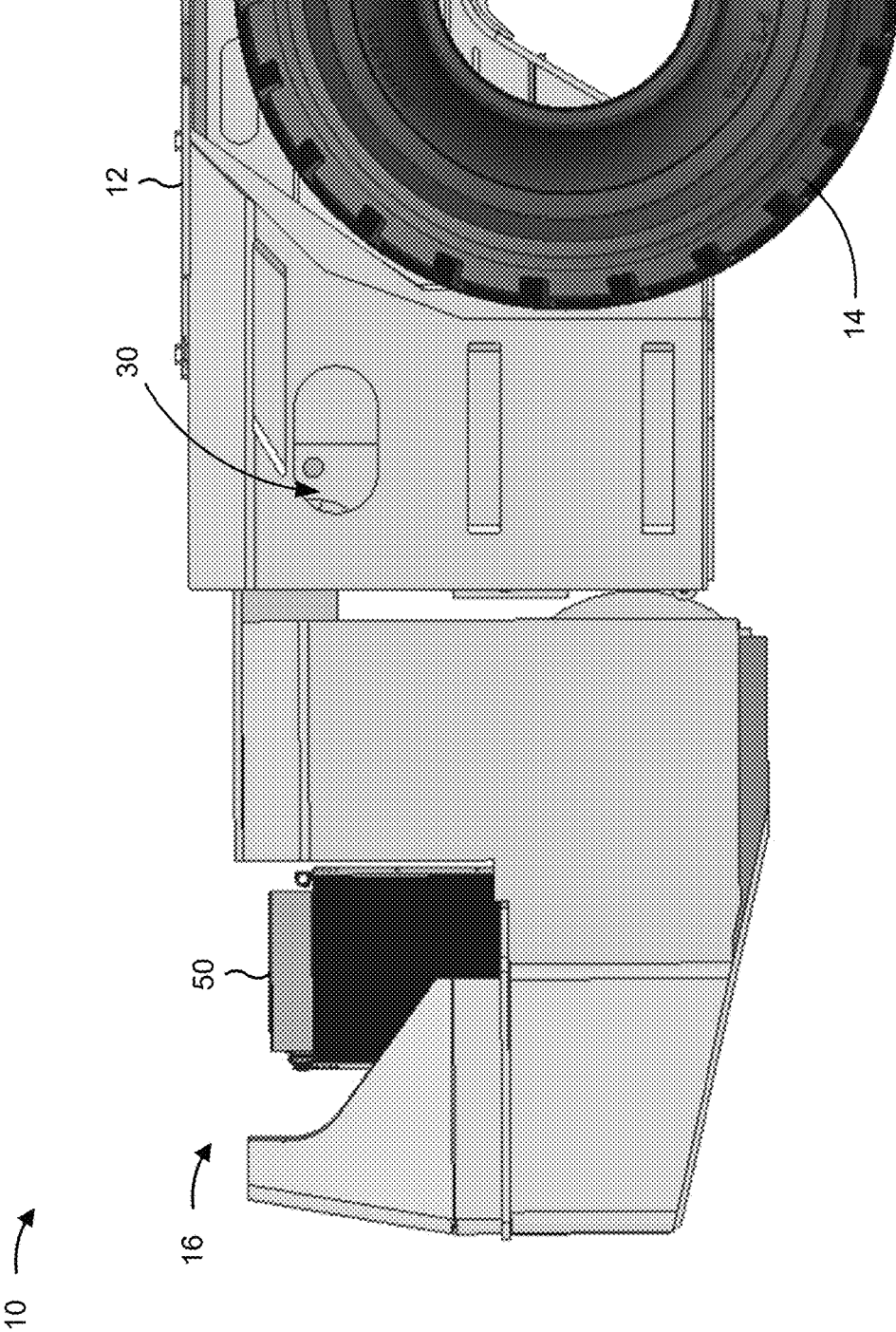
FIG. 2 is a partial side view of an example machine.

FIG. 2 is a partial side view of the machine 10. As shown, the machine 10 includes a lift system 30 and the power unit 16. The power unit 16 includes one or more energy storage units 50. An energy storage unit 50 may include a battery cell, a battery module, a battery pack, a fuel cell, or the like. The lift system 30 is configured to lower the power unit 16 off from the machine 10 and/or raise the power unit 16 onto the machine 10 in connection with a power unit replacement. As described below, the lift system 30 and the power unit 16 include features of a power unit replacement system configured to maintain the power unit 16 in an upright and level orientation, or another desired orientation, during replacement. For example, the power unit replacement system may maintain a bottom of the power unit 16 flat at any ground height relative to the machine 10.

As indicated above, FIG. 2 is provided as an example. Other examples may differ from what is described with regard to FIG. 2.

Figure 3:
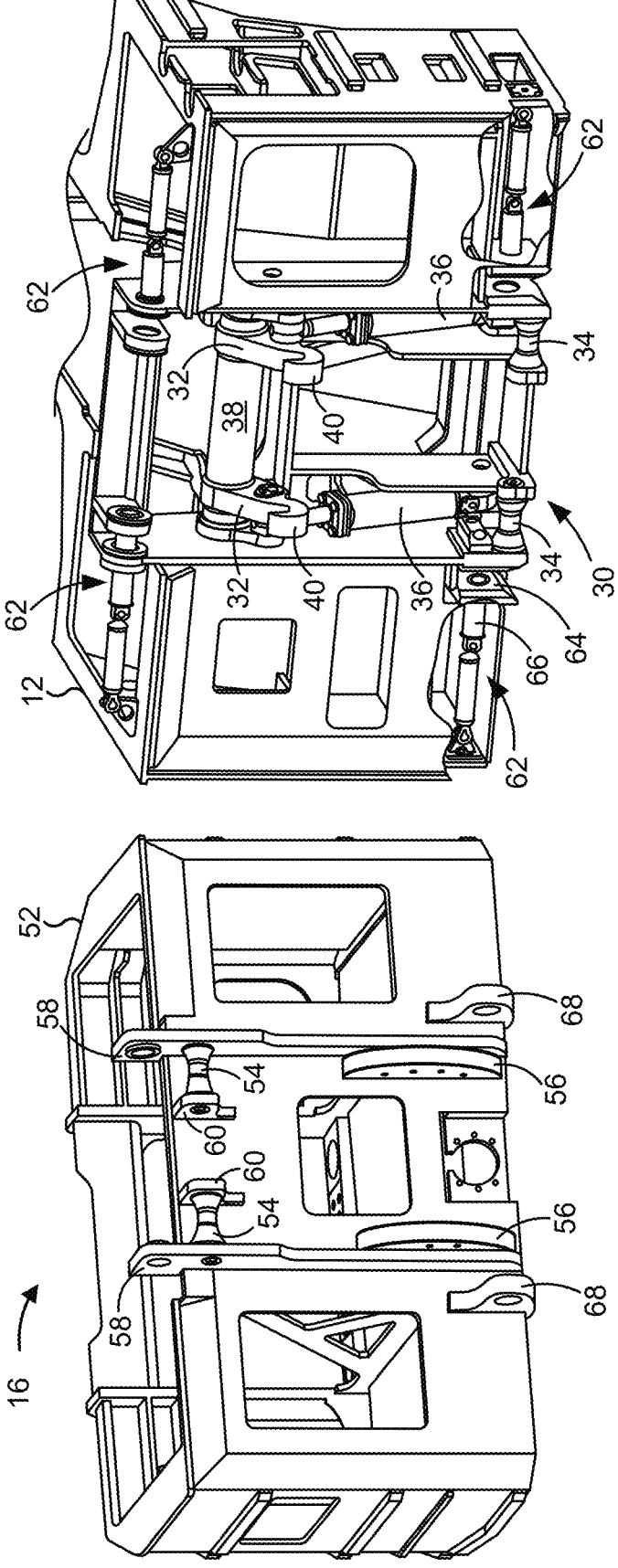
FIG. 3 is a perspective view of a portion of a frame of a machine, and a perspective view of a power unit.

FIG. 3 is a perspective view of a portion of the frame 12 of the machine 10 including the lift system 30, and a perspective view of the power unit 16. FIG. 3 shows the lift system 30 at a rear of the frame 12. However, in some examples, the lift system 30 may be located at a front of the frame 12, at a side of the frame 12, or at another location. The lift system 30 includes one or more lift arms 32 attached to the frame 12 and one or more rollers 34 attached to the frame 12. The power unit 16 includes a power unit housing 52 containing the energy storage unit(s) 50 (not shown in FIG. 3). The power unit housing 52 includes one or more engagement elements 54 and one or more cam elements 56 projecting from the power unit housing 52. A power unit replacement system, described herein, may include the lift system 30 and the power unit housing 52.

The power unit housing 52 is a box-shaped container defining an interior cavity configured to contain the energy storage unit(s) 50. The power unit housing 52 may have one or more openings in the walls of the power unit housing 52 to provide ventilation and/or access to the energy storage unit(s) 50. The engagement elements 54 and the cam elements 56, described herein, may be attached to a sidewall of the power unit housing 52.

The lift arms 32 are configured to actuate between a raised position (e.g., to lift the power unit 16 into place on the machine 10) and a lowered position (e.g., to lower the power unit 16 off from the machine 10). The lift arms 32 of the lift system 30 may be pivotably attached to the frame 12 (e.g., by pins or another pivoting coupling) in a configuration to pivot the lift arms 32 between the raised position and the lowered position. For example, the lift arms 32 may actuate along an arc-like path. The lift arms 32 may be coupled to respective lifting cylinders 36, such that actuation of the lifting cylinders 36 actuates the lift arms 32 (e.g., pivots the lift arms 32). A lifting cylinder 36 may be a hydraulic cylinder, a pneumatic cylinder, or the like, having a cylinder body and a rod axially movable relative to the cylinder body. In some examples, a lift arm 32 may be actuated by another type of actuator, such as a sprocket, chain, and motor system, a pulley system, or the like. The lift arms 32 may be coupled together (e.g., by a torque tube 38) to facilitate even distribution of load between the lift arms 32. In some implementations, the lift system 30 includes two lift arms 32, as shown.

Each lift arm 32 may include an engagement element 40 at an end of the lift arm 32. The engagement elements 40 may be configured to engage the power unit housing 52 with the lift arms 32 to facilitate lifting of the power unit housing 52. The engagement elements 40 also may be configured to release the power unit housing 52 to facilitate setting down of the power unit 16 on a ground surface. As shown, an engagement element 40 may include a hook. An opening into the hook may face upward relative to a ground surface. Additionally, or alternatively, an engagement element 40 may include a lifting pin, a magnet, or the like.

The engagement elements 54 of the power unit housing 52 are configured to engage the power unit housing 52 with the lift arms 32. For example, the engagement elements 54 of the power unit housing 52 are configured to engage with the engagement elements 40 of the lift arms 32 (e.g., each engagement element 40 and engagement element 54 defining a coupling). The power unit housing 52 includes a respective engagement element 54 for each lift arm 32 and engagement element 40 of the lift system 30. An engagement element 54 may be suspended between an upper locking lug 58 and a bracket 60 of the power unit housing 52, thereby providing separation between a surface of the power unit housing 52 and the engagement element 54.

An engagement element 54 may include a lifting pin arranged orthogonally to a direction of raising and lowering of the lift arm 32. For example, the lifting pin may be arranged horizontal relative to a ground surface. The lifting pin may be rotationally fixed or may be rotatable. For example, the lifting pin may be a lifting roller. In some examples, the lifting roller may have inwardly tapering ends (e.g., in a shape of cones, or conical frustums, with facing vertices) configured to align an engagement element 40 (e.g., a hook) to a center of the lifting roller. Additionally, or alternatively, an engagement element 54 may include a hook, a magnet, or the like.

When the lift arms 32 are raised, the engagement elements 40 of the lift arms 32 couple with the engagement elements 54 of the power unit housing 52, thereby engaging the power unit housing 52 with the lift arms 32 to facilitate lifting of the power unit housing 52. For example, when the lift arms 32 are raised, the hooks of the lift arms 32 catch on the lifting pins (e.g., lifting rollers) of the power unit housing 52.

Similarly, when the lift arms 32 are lowered (e.g., to a maximum lowered position), the engagement elements 40 and the engagement elements 54 disengage, thereby disengaging the power unit housing 52 from the lift arms 32 to detach the power unit 16 from the machine 10. For example, when the lift arms 32 are lowered (e.g., to a maximum lowered position), the hooks of the lift arms 32 clear the lifting pins (e.g., lifting rollers) of the power unit housing 52.

The rollers 34 of the lift system 30 may be arranged on the frame 12 below the lift arms 32 (e.g., relative to the raised position and the lowered position of the lift arms 32). For example, the rollers 34 may be arranged on the frame 12 so as to contact the power unit 16 below a center of gravity of the power unit 16. A roller 34 may include a bearing (e.g., a ball bearing, a roller bearing, or the like), a shaft and roller shell assembly, or the like. In some examples, a roller 34 may have inwardly tapering ends (e.g., in a shape of cones, or conical frustums, with facing vertices) configured to align a cam element 56 to a center of the roller 34. The lift system 30 may include two rollers 34, as shown. For example, a first roller 34 may be vertically aligned with a first lift arm 32, and a second roller 34 may be vertically aligned with a second lift arm 32 and axially aligned with the first roller 34.

The cam elements 56 projecting from the power unit housing 52 are configured to slidably engage with the rollers 34 of the lift system 30. For example, the cam elements 56 may slidably engage with the rollers 34 during actuation of the lift arms 32. A cam element 56 may be integrally formed on the power unit housing 52, may be welded to the power unit housing 52, or may be bolted to the power unit housing 52, among other examples. The lift system 30 may include two cam elements 56, as shown. For example, a first cam element 56 and a second cam element 56 may project from the power unit housing 52 parallel to each other.

A cam element 56 may have a flat base against the power unit housing 52 and a rounded (e.g., arc-shaped) edge that projects from the power unit housing 52 (e.g., the cam element 56 may be in the shape of an ellipse segment). A contour of the rounded edge may correspond to an outward movement and/or inward movement of the power unit 16 relative to the frame 12 during a power unit replacement (e.g., such that the cam element 56 maintains contact with a roller 34 during the power unit replacement). For example, a radius of an arc-like path of a lift arm 32 (e.g., from a pivot point of the lift arm 32 to an engagement point of the lift arm 32) may be equal to, or approximately equal to (e.g., +1%), a radius defined by a profile of a cam element 56. Accordingly, during a power unit replacement, the particular contour of the rounded edge maintains the power unit 16 in an upright and level orientation (or another desired orientation), and prevents the power unit 16 from swinging inwardly toward the frame 12.

In some implementations, the power unit housing 52 may include the rollers 34, and the lift system 30 may include the cam elements 56 attached to the frame 12. For example, the lift system 30 may include one of the rollers 34 or the cam elements 56, and the power unit housing 52 may include the other of the rollers 34 or the cam elements 56.

The machine 10 may include one or more lock systems 62 attached to the frame 12. A lock system 62 may be configured to secure the power unit 16 to the frame 12. A lock system 62 may include a latch element 64 and a locking cylinder 66. The latch element 64 may include one or more strike plates, each having an aperture. For example, the latch element 64 may include a pair of separated strike plates having aligned apertures. The locking cylinder 66 may be configured to extend to a locked position in the latch element 64 (e.g., in the aperture(s)) and retract to an unlocked position from the latch element 64. The locking cylinder 66 may be a mechanical actuator (e.g., a linear actuator) configured to actuate to the locked position or the unlocked position responsive to an electrical control signal. As shown, the machine 10 may include a pair of upper lock systems 62 (e.g., positioned above the lift arms 32), and a pair of lower lock systems 62 (e.g., positioned below the lift arms 32).

The power unit housing 52 may include one or more locking lugs configured to lock into the lock systems 62. For example, the power unit housing 52 may include one or more upper locking lugs 58, described above, and/or one or more lower locking lugs 68. A locking lug 58, 68 may have an opening configured to receive a locking cylinder 66 of a lock system 62. For example, when the power unit 16 is moved into place with respect to the frame 12, the opening in the locking lug 58, 68 may align with a locking cylinder 66 and the apertures(s) of a latch element 64 of a lock system 62 (e.g., the locking lug 58, 68 may slot between a pair of strike plates of the latch element 64). Accordingly, the locking cylinder 66 may extend through the opening of the locking lug 58, 68 and into the aperture(s) of the latch element 64 to secure the power unit 16 to the frame 12.

As shown, the upper locking lugs 58 may be configured to lock into respective upper lock systems 62 of the frame 12, and the lower locking lugs 68 may be configured to lock into respective lower lock systems 62 of the frame 12. For example, an upper locking lug 58, and the opening in the upper locking lug 58, may extend above an upper rim of the power unit housing 52 to facilitate engagement with an upper lock system 62. A lower locking lug 68, and the opening in the lower locking lug 68, may project from an outer surface of the power unit housing 52. The engagement elements 54, the cam elements 56, and the locking lugs 58, 68 may be located at a same side of the power unit housing 52.

In some implementations, the frame 12 and/or the power unit housing 52 may include alignment features (additionally, or alternatively, to the tapered rollers described above) that facilitate alignment of the power unit housing 52 to the frame 12. The alignment features may include one or more tapered and/or angled elements on the frame 12 and/or the power unit housing 52. For example, a first tapered and/or angled element of the frame 12 may slide along a second tapered and/or angled element of the power unit housing 52 during lifting of the power unit housing 52 to provide lateral centering of the power unit housing 52 relative to the frame 12. For example, one of the frame 12 or the power unit housing 52 may include one or more outwardly-angled fins (e.g., at opposite side edges of the frame 12 or the power unit housing 52) that are configured to engage with one or more inwardly angled corners of the other of the frame 12 or the power unit housing 52. As another example, one of the frame 12 or the power unit housing 52 may include tapered pins that are received in slots in the other of the frame 12 or the power unit housing 52.

As indicated above, FIG. 3 is provided as an example. Other examples may differ from what is described with regard to FIG. 3.

Figure 4:
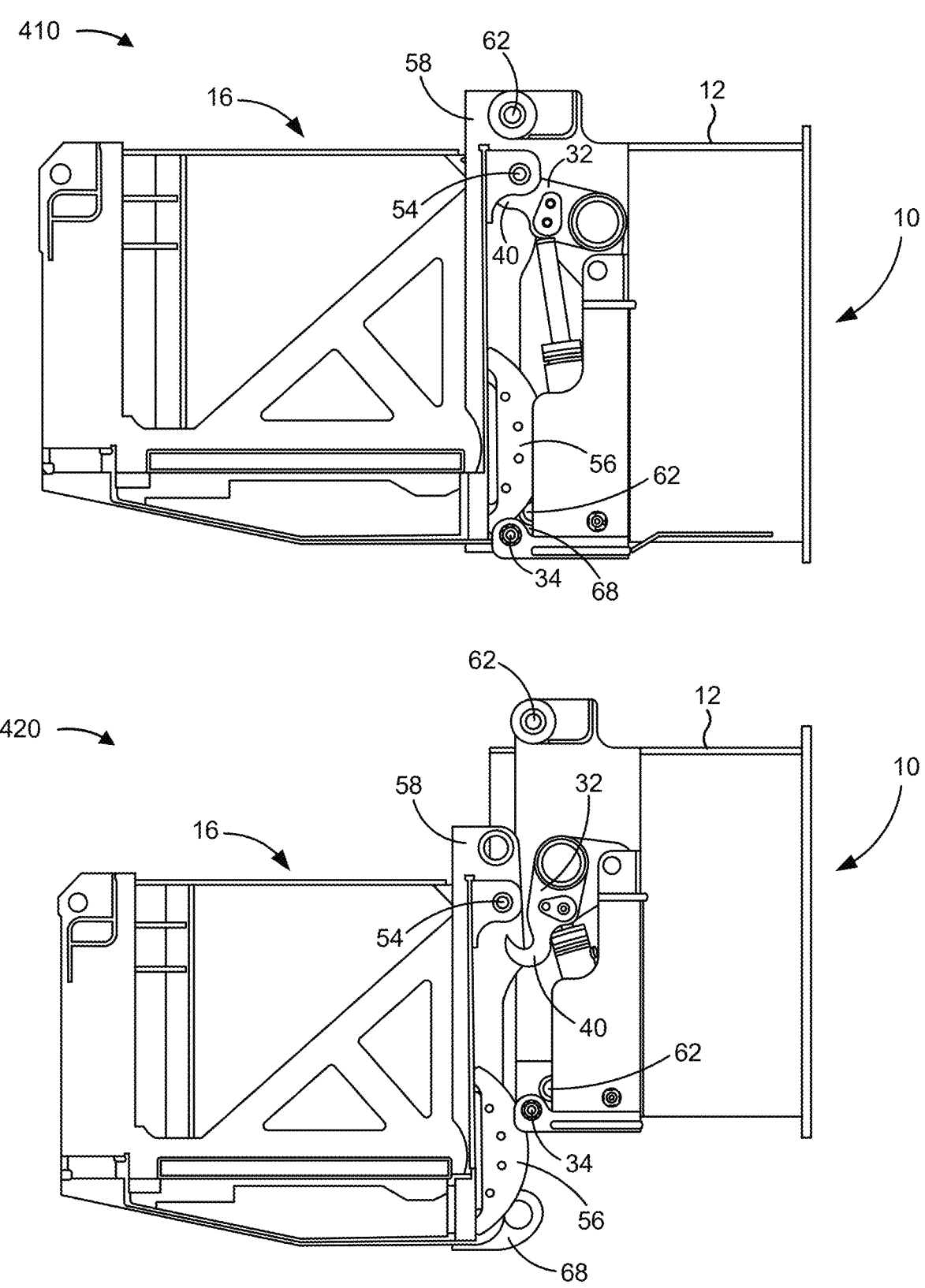
FIG. 4 is a diagram of an example power unit replacement operation performed by a machine.

FIG. 4 is a diagram of an example power unit replacement operation performed by the machine 10. FIG. 4 shows a cutaway view of the machine 10 to illustrate the cooperation between the lifting system 30 and the power unit housing 52.

Reference number 410 shows the machine 10 with the lift arms 32 in the raised position. Reference number 420 shows the machine 10 with the lift arms 32 in the lowered position. As the lift arms 32 transition from the raised position to the lowered position, the power unit 16 is moved slightly outward while being lowered from the frame 12. Moreover, as the lift arms 32 transition from the raised position to the lowered position, the cam elements 56 slide across the rollers 34, thereby allowing the power unit 16 to maintain an upright and level orientation (or another desired orientation). When the lift arms 32 reach a fully lowered position, the engagement elements 40 disengage from the engagement elements 54, allowing the machine 10 to detach the power unit 16.

To lift the power unit 16 into place on the machine 10, the operations described above are reversed. For example, the lift arms 32 may transition from the lowered position to the raised position, thereby coupling the engagement elements 40 with the engagement elements 54 and lifting the power unit 16. As the lift arms 32 transition from the lowered position to the raised position, the cam elements 56 slide across the rollers 34, thereby allowing the power unit 16 to maintain an upright and level orientation (or another desired orientation). When the power unit 16 has been positioned into place on the machine 10, the lock systems 62 may engage the locking lugs 58, 68 to secure the power unit 16 to the frame 12.

As indicated above, FIG. 4 is provided as an example. Other examples may differ from what is described with regard to FIG. 4.

INDUSTRIAL APPLICABILITY

The power unit replacement system described herein may be used with any machine that utilizes an electric drive. For example, the power unit replacement system may be used with a battery-powered work machine, such as an underground mining machine. In a typical power unit replacement procedure, a used power unit of a work machine can be lifted off the work machine using a lift arm connected above a center-of-gravity of the power unit. This can result in a bottom of the power unit swinging inward and impacting the work machine, thereby damaging the power unit and/or the work machine. Moreover, a tilted orientation of the power unit due to the swinging may cause the power unit to tip over when being set down on a ground surface, thereby damaging the power unit.

The power unit replacement system described herein is useful for maintaining a power unit of a work machine in an upright and level orientation, or another desired orientation, during replacement. In particular, the power unit replacement system can be used to set a power unit down flat at any ground height relative to the work machine and/or to raise a power unit while maintaining a levelness of the power unit. In this way, the power unit replacement system facilitates power unit replacement that reduces damage to the power unit and/or the work machine. Furthermore, the power unit replacement system enables fast and efficient power unit replacement, thereby minimizing machine downtime. Additionally, the power unit replacement system provides near-vertical raising and lowering of a power unit, thereby facilitating power unit replacement in tight spaces, such as a mine.

What is claimed is:

1. A machine, comprising:
   a frame;
   a lift system, comprising:
      a lift arm attached to the frame,
         the lift arm configured to actuate between a raised position and a lowered position; and
      a roller fully rotatably attached to the frame; and a power unit, comprising:
      an energy storage unit; and
      a power unit housing, containing the energy storage unit, comprising:
         an engagement element configured to engage the power unit housing with the lift arm; and
         a cam element, projecting from the power unit housing, configured to slidably engage with the roller during actuation of the lift arm.

2. The machine of claim 1, wherein the engagement element is a lifting roller attached to the power unit housing.

3. The machine of claim 1, wherein the lift arm comprises a hook, at an end of the lift arm, in a configuration to engage the engagement element.

4. The machine of claim 1, wherein the lift arm is pivotably attached to the frame in a configuration to pivot the lift arm between the raised position and the lowered position.

5. The machine of claim 1, wherein the roller has inwardly tapering ends configured to align the cam element to a center of the roller.

6. The machine of claim 1, wherein the roller is a first roller and the cam element is a first cam element,
   wherein the lift system further comprises a second roller attached to the frame and axially aligned with the first roller, and
   wherein the power unit housing further comprises a second cam element projecting from the power unit housing parallel to the first cam element and configured to slidably engage with the second roller.

7. The machine of claim 1, further comprising:
   a latch element; and
   a locking cylinder configured to extend to a locked position in the latch element and retract to an unlocked position from the latch element.

8. The machine of claim 7, wherein the power unit housing further comprises:
   a locking lug projecting from the power unit housing,
      wherein the locking lug has an opening configured to receive the locking cylinder.

9. The machine of claim 1, wherein the cam element has a rounded edge with a contour configured to maintain a level of the power unit during actuation of the lift arm.

10. A machine, comprising:
   a frame;
   a lift system, comprising:
      a lift arm attached to the frame,
         the lift arm configured to actuate between a raised position and a lowered position; and
      a roller, attached to the frame, configured to slidably engage with a cam element of a power unit for the machine during actuation of the lift arm, wherein the roller has inwardly tapering ends configured to align the cam element to a center of the roller; and
   a lock system, comprising:
      a latch element; and
      a locking cylinder configured to extend to a locked position in the latch element and retract to an unlocked position from the latch element,
         the locking cylinder configured to engage a locking lug of the power unit.

11. The machine of claim 10, further comprising a lifting cylinder, coupled to the lift arm, configured to actuate the lift arm between the raised position and the lowered position.

12. The machine of claim 10, wherein the lift arm is a first lift arm, and
   wherein the machine further comprises a second lift arm.

13. The machine of claim 10, wherein the roller is arranged on the frame below the lift arm relative to the raised position and the lowered position of the lift arm.

14. The machine of claim 10, wherein the lift arm comprises a hook at an end of the lift arm.

15. A power unit for a machine, comprising:

an energy storage unit; and a power unit housing, containing the energy storage unit, comprising:

an engagement element configured to engage the power unit housing with a lift arm of the machine; and a cam element projecting outwardly from the power unit housing and having a continuously convex exterior surface configured to slidably engage with a roller of the machine during actuation of the lift arm.

16. The power unit of claim 15, wherein the engagement element is a lifting pin attached to the power unit housing.

17. The power unit of claim 15, wherein the engagement element is a lifting roller attached to the power unit housing.

18. The power unit of claim 17, wherein the lifting roller has inwardly tapering ends configured to align an engagement element of the lift arm to a center of the roller.

19. The power unit of claim 15, wherein the power unit housing further comprises:

a locking lug projecting from the power unit housing.

20. The power unit of claim 15, wherein the continuously convex exterior surface is configured to maintain a level of the power unit during actuation of the lift arm.

\* \* \* \* \*